3,277,072
FLUID ROSIN

Paul D. Patrick and Manton G. Bestul, Charleston, S.C., assignors to West Virginia Pulp and Paper Company, New York, N.Y., a corporation of Delaware
No Drawing. Filed July 13, 1964, Ser. No. 382,401
8 Claims. (Cl. 260—97.5)

This invention relates to rosin which is fluid at ambient temperatures (77° F.) and to methods of preparing such rosin.

Rosin is a complex mixture of many resin acids which have, in general, similar chemical and physical characteristics. The resin acids of rosin are usually classified into two types: abietic type acids and pimaric type acids. The principal difference between the abietic and pimaric types of acids resides in the structure of the hydrocarbon groupings attached to the basic three ring structure. In the case of the abietic type acids this hydrocarbon side chain is in the form of an isopropyl group while in the pimaric type acids the three carbon atoms exist as a methyl and ethylene group. This difference is illustrated in the structures of the parent acids below.

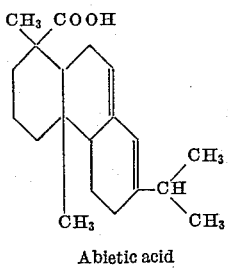 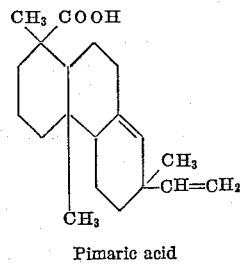

Abietic acid Pimaric acid

Within each of these major types of resin acids there are a large number of specific resin acids which differ from one another in a number of ways. The most important differences reside in the degree of unsaturation of the resin acid and in the location within the resin acid structure of these unsaturated linkages (structure isomerization). Additional differences between the resin acids exist in the orientation of the side groups to the ring (geometric isomerization). The number of possible different resin acids is quite large and although it has been quite difficult until recently to separate the resin acids from one another, at least 19 distinct resin acids have so far been isolated and identified.

The geometric type of resin acid isomers apparently differ relatively little in chemical properties, and are consequently considered to be of relatively little importance. On the other hand, the structural isomers often have substantial differences in chemical properties. Most important of the structural isomers are abietic acid and its isomers of neoabietic, levopimaric and palustric acids. All four of these acids have a conjugated system of double bonds and differ from one another only in the location of the two double bonds within the resin acid structure. Another isomer system which appears to be of importance is the monounsaturated dihydroabietic acids of which there are at least five different acids.

There are three different classes of rosins which are classified according to the method in which they are obtained from the pine tree. These classifications of rosin are gum rosin, wood rosin, and tall oil rosin. Gum rosin is obtained from the oleoresin which is exuded from the pine tree when it is wounded. The oleorosin also contains substantial quantities of turpentine, which is removed to distillation during conversion of the oleoresin to gum rosin, and small amounts of high boiling neutral resinous terpene materials and other unsaponifiable materials most of which are products from the decarboxylation of resin acids. The total unsaponifiables, including the resinous terpenes which constitute well over half of these unsaponifiables, constitute from 7 to 18% of the gum rosin with the remainder being a mixture of resin acids.

Wood rosin is obtained by solvent extraction of aged virgin pine stumps. As with the gum rosin, some resinous terpenes and other unsaponifiables are retained with the rosin. The quantity and composition of the unsaponifiables in wood rosins is about the same as in gum rosins: the total unsaponifiables varying between about 7 to 18% with the remainder being a mixture of resin acids.

Tall oil rosin is obtained from waste liquors from the pulping of wood to obtain fiber. In such pulping operations the wood is subjected to the action of strong chemicals and high temperatures. As recovered from the waste liquor, the rosin is associated with an approximately equal amount of fatty acids and substantial quantities of various neutral unsaponifiable materials. There is, however, little if any of the terpene resin materials present after the stringent pulping action. Tall oil rosin is commonly separated from the fatty acids and unsaponifiable materials by distillation. However, even the best known separation by this method yields a rosin which contains limited quantities of fatty acids and unsaponifiable materials.

It will thus be seen that tall oil rosin differs from the wood and gum rosins in the type of "impurities" associated with the resin acids. Additionally, however, due to the method by which they are derived, the various classes of rosin also differ substantially in the composition of specific resin acids present. These differences may be seen in the Table 1 presenting typical partial analysis of the different classes of rosins as compared to the rosin as it naturally occurs in the pine tree in oleoresin. Of substantial importance is the fact that, due to the treatment of the rosin to recover it from the wood, substantial changes occur in the composition of the resin acids.

TABLE 1.—COMPOSITION OF ROSINS AND OLEORESIN

| Resin Acids | Oleoresin [1] | Gum [1] | Tall Oil [1] | Wood [2] |
|---|---|---|---|---|
| Abietic, Percent | 10 | 20 | 40 | 43 |
| Levopimaric, Percent | 26 | 0 | 0 | 2 |
| Palustric, Percent | 11 | 18 | 6 | 13 |
| Neoabietic, Percent | 11 | 17 | 4 | 4 |
| Dehydroabietic, Percent | 3 | 5 | 18 | 10 |

[1] From "Composition Studies on Gum and Tall Oil Resins," by Ray V. Lawerence, volume 45, No. 8, TAPPI, August, 1962.
[2] "Resin Acids-Analysis by Mass Spectroscopy," Genge, C. A., vol. 31, No. 11, Analytical Chemistry, November, 1959.

It has long been recognized that due to the nature of the resin acids in the various rosins substantial changes in the characteristics of the rosin can be obtained in a number of ways. Among the many methods of altering the composition of resin acids are numerous heat or acid isomerizations wherein the equilibrium percentages of the resin acid isomers, primarily the equilibrium of abietic, palustric, levopimaric and neoabietic acids, is changed; hydrogenation using a catalyst such as palladium or platinum wherein hydrogen is added to the double bonds; and disproportionation which results in a rearranging of the resin acids by removing hydrogens from some acids and adding them to other acids. Disproportionation has been brought about by heating at high temperatures for long periods of time, with the use of mineral acids and by the use of catalysts such as iodine, sulfur, sulfur dioxide, selenium or a noble metal on carbon. The net effect of disproportionation reactions is to convert the diunsaturated resin acids such as abietic and its isomers, to saturated tetrahydroabietic acid, monounsaturated dihydroabietic acid isomers, and triunsaturated dehydroabietic acid. The quantity and type of resin acids produced during disproportionation varies considerably depending upon the catalyst and conditions employed in the operation and the class of rosin used as the starting material.

Rosin is employed in an exteremly wide variety of end uses. As many of these end uses require different rosin characteristics, it is customary to "tailor" the rosin by appropriate modification to obtain the required properties. For example, where a hard high melting rosin is required the rosin can be polymerized. In certain uses, however, such as in some adhesives where low temperature tack is desirable or in bulk tank car shipment where heat is required to make the rosin fluid enough to pump from the car, a lower melting "softer" rosin is desirable. Hitherto, it has not been possible to obtain the very soft rosins desired; all mixtures of resin acids previously known being hard brittle amorphous solids at room temperature and having ring and ball softening points above 140° F.

It is the primary object of this invention to prepare rosins which are fluid at ambient temperatures (77° F.). Such fluid rosins have ring and ball softening points below 130° F. Other secondary objects will be apparent from the following disclosures:

We have found that soft rosins meeting the requirements of our object can be prepared by disproportionating rosin in the presence of iodine. However, it has been determined that the conditions under which such disproportionation is conducted are critical and that these conditions vary with the class of rosin being treated.

The use of iodine as a disproportionating catalyst for rosin is well known. In U.S. Patent 2,311,386 to Hasselstrom for example, there is disclosed a process whereby tall oil or the abietic acid constituents thereof which separate out by crystallization from the tall oil may be heated at 100 to 280° C. with from 0.1 to 3% of an iodine catalyst. As a result of such disproportionation, those resin acids containing the conjugated double bond are primarily converted to dihydroabietic and dehydroabietic acids thus producing a rosin composition much more stable to oxidation. While the process disclosed in this patent is quite similar to that which we employ to produce our soft rosins, the rosin compositions produced by this patent are not the soft rosins we obtain due to certain critical differences in the processes.

Additionally, in U.S. Patent 2,299,577 also to Hasselstrom there is disclosed a process wherein wood or gum rosins are heated from about 100 to 240° C. with from 0.2 to 5% iodine catalyst. As evidenced by the data shown in Tables B and C of the patent and as further indicated hereinbelow, soft resin acids compositions are not obtained.

As has been indicated hereinabove, tall oil rosin, wood rosin and gum rosin differ from one another in regard to the quantity and type of non-rosin acid materials necessarily associated with the resin acids. As also indicated hereinabove, these rosin differ from one another in the types and relative quantities of the resin acids present. Due apparently to these differences between the various rosins, the effect of heating with the iodine catalyst varies with the class of rosin used. As a consequence, the exact conditions necessary to produce the soft rosin of this invention also vary with the type rosin employed as the starting material.

Tall oil rosin is the most easily converted to a soft rosin product. Such conversion can be accomplished by heating the tall oil rosin to a temperature between 300° F. and 580° F. with from 0.01 to 3% iodine for a sufficient length of time to reduce the conjugated diunsaturated resin acids content to less than about 5%. (As employed herein the quantity of conjugated diunsautrates is determined in the method of Ball and Vardell, Journal American Oil Chemists Society, April 1951, vol. 28 No. 4 pp. 131–141.) Such heating may be conducted in an open container although preferably in a closed container where the autogenously produced pressure of from 5 to 75 p.s.i. can be maintained. The time required is, of course, dependent upon the quantity of catalyst employed and the temperature, being inversely related to both factors. The time, in general, though may vary from about 10 minutes to 10 hours. As with most reactions, it is not generally desirable to operate under conditions close to these limits due to slow reaction rates near the lower limits and production of undersiable by-products near the upper limits. For this reason, it is preferable to operate using about 0.1 to 1.0% iodine catalyst at about 400 to 500° F.

While there is little criticality in the exact process conditions employed when using tall oil rosin as the starting material, it should be recognized that it is possible by regulating these conditions to produce a wide variety of soft rosins having ring and ball softening points ranging from about 110 to 135° F. As would be expected, the use of higher temperatures and increased quantity of catalyst speed up the reactions and for a given time of reaction will produce softer rosins. These variables of temperature and catalyst may, however, be easily offset by use longer reaction time.

The use of pressure during the reaction also results in softer rosin. The use of pressure has a different affect from the other vairables, however. Pressure, by preventing loss of hydrogen from the system primarily influence the type of resin acids which are formed during the disproportionation reaction rather than the rate at which disproportionation occurs. Thus, where very soft rosins are desired or as will be explained below, where the starting tall oil rosin is of marginal quality, the use of pressure is necessary.

While the process conditions employed with tall oil rosin are not generally critical as far as producing a soft rosin product of this invention, it is extremely critical that the quantity of polyunsaurated non-resin acid materials in the tall oil rosin be carefully controlled. It has been determined that these polyunsaturated impurities must be limited to a maximum of 6% of the resin acids in the rosin being treated. The mechanism by which these polyunsaturated impurities affect the disproportionation of the resin acids is not known for certain although it appears that they accept hydrogen more readily than the resin acids thereby reducing the degree of hydrogenation of the resin acids. Whatever the reason, where the starting tall oil rosin contains quantities of polyunsaturated impurities in excess of the above amount, a hard rosin rather than a soft rosin is formed upon treatment with iodine. The 6% level is itself rather marginal requiring the use of pressure to obtain a soft rosin product. Preferably, the polyunsaturated impurities should be limited to about 3% at which level the reaction can be more easily conducted. Where very soft rosin products are desired, e.g. those having a ring and ball softening point of about 115° F. or less, even lower percentages on the order of 1.5% or less of the polyunsaturated impurities should be present.

Diunsaturated linoleic fatty acids constitute more than 90% of the total polyunsaturated non-resin acid materials. As these linoleic acids normally comprise from 25 to 50% of the total fatty acids in tall oil, it will readily be seen that in order to practice the present invention, it is necessary to limit the amount of fatty acids in the rosin to be treated. The exact quantity of fatty acids which is permissible will, of course, depend upon the percentage of linoleic acid in the fatty acid. Quite obviously when the fatty acids contains a low percentage of linoleic acids, a greater quantity of the fatty acids can be tolerated. Based upon linoleic percentages of between 25 and 50%, the maximum permissable quantity of tall oil fatty acids which can be present in the starting rosin material is about 19 and 10.5%, respectively.

The unsaponifiable materials present in tall oil rosin cannot practically be reduced much below 3 to 6% by distillation methods. The unsaponifiables added to the permissible quantities of fatty acids leave a minimum balance of resin acids in the rosin of 75%. It will be noted that this minimum of rosin acids is the extreme case where the linoleic acids are present in the rosin in a maximum amount and constitute a minimum percentage of the fatty acdis. In more common practice, where the linoleic acids are limited to 3% of the resin acids and they constitute 35–40% of the fatty acids, the resin acids will constitute in the neighborhood of 88% of the rosin. In the more preferred practice where the linoleic is limited to 1.5% of the resin acids, the resin acids will constitute about 92% of the rosin.

When employing wood or gum rosins as the starting material, it is essential in order to obtain soft products that very severe conditions of treatment be employed. With these materials it is not possible to conduct the treatment without maintaining pressure on the system. The autogeneous pressures developed by these rosins during the treatment is not the relatively low pressures developed by tall oil rosin but are much higher being on the order of 200 to 700 p.s.i. Not only must pressure be used but it is also necessary that increased catalyst and temperature also be employed. For gum rosin, for example, suitable conditions for treatment are heating at temperatures between 450 and 550° F. with between 0.75 and 3% idoine catalyst under a pressure at least equal to the autogeneously developed pressure. Wood rosin is even more difficult to treat than gum rosin and requires such severe conditions that the use of food rosin is considered marginal due to the possibility of extensive degradation of the rosin acids. Suitable conditions for wood rosins are in the range of from 1 to 3% iodine at a temperature of from 475 to 580° F. Again pressure at least as great as the autogeneous pressure developed must be maintained.

The reasons for the differences tall oil rosin and wood and gum rosins is not thoroughly understood. The marked increase in pressure in the wood and gum rosins reacting however, appear to be due to the presence of the terpinous materials which may be degraded into highly volatile pressure creating substances during the reaction. These terpinous materials may also be the reason why the more severe conditions of treatment are necessary. However, it is possible that the more severe conditions are caused by the specific composition of resin acids present which as has been mentioned are considerably different in the cases of tall oil, wood and gum rosins.

It has been determined, however, that as with tall oil rosin, the quantities of unsaturated impurities in the wood and gum rosin must be carefully controlled. As has been indicated, the primary impurities in wood and gum rosins are resinous terpene materials which are unsaponifiable and highly unsaturated. In addition, there are a quantity of other unsaponifiable materials present. The total quantity of these unsaponifiables must be limited to about 12% by weight and preferably to less than 8%. The "N" grades of wood and gum rosins contain close to this maximum percentage of unsaponifiable compounds and hence are much less desirable for use than the more highly refined grades such as "WW" which are preferred for use in this invention. As the usable wood and gum rosins contain up to 12% of unsaponifiable materials the minimum percentage of resin acids in these rosins is 88%.

The analysis for resin acids is commonly made according to ASTM method D1585–58T (Wolff method). Due to a number of factors involved in this method, including a basic assumption that the resin acids have a molecular weight equal to abietic acid which comprises only a minor portion of the total resin acids, it invariably gives results which are several percent lower than the actual resin acid content. Because of this low value of resin acids obtained by this method, separate analysis of tall oil rosin for fatty acids, resin acids and unsaponifiable materials (the only types of materials present) does not add up to 100% of the tall oil rosin. Similarly separate analysis of wood or gum rosin for unsaponifiables and resin acids does not add up to 100%. Due to this analytical discrepancy, the percentage of resin acids as used and reported herein is determined in the case of tall rosin by analyzing for fatty acids according to ASTM method D1585–58T and for unsaponifiables by ASTM method D1065–56 and subtracting these values from 100% and in the case of wood and gum rosin by analyzing for unsaponifiables by ASTM method D1065–56 and subtracting from 100%. The values for resin acid content obtained by this method are believed to be much more accurate than the values obtained by ASTM method D1585–58T (Wolff method) for resin acid content.

The practice of this invention may be seen in detail in the following examples.

*Example 1*

1.75 parts by weight of iodine were added to 1000 parts by weight of rosin distilled from tall oil. The rosin had the following analysis:

Fatty acids, percent _____(36.8% linoleic acid)__  3
Unsaponifiables, percent _____  4
Resin acids, percent _____ 93
   Percent conjugated diunsaturates _____ 37.0
   Percent dehydroabietic _____ 30.4
   Percent other resin acids _____ 32.6
Acid number _____ 175
Softening point,[1] ° F. _____ 169

[1] The softening point as used above and elsewhere in this application is the Ring and Ball softening point as determined by ASTM E28–58T.

The tall oil rosin and iodine were heated in an open vessel to 490° F. and the temperatures maintained at that level for 100 minutes.

The rosin was then sparged of iodine by bubbling $CO_2$ through the rosin for 15 minutes. The rosin was then cooled and analyzed with the following results:

Fatty acids, percent _____  3
Unsaponifiables, percent _____ 12
Resin acids, percent _____ 85
   Percent conjugated diunsaturates _____ 1.8
   Percent dehydroabietic _____ 37.8
   Percent other resin acids _____ 60.4
Acid number _____ 163
Softening point, ° F. _____ 120

Using the same starting tall oil rosin the above run was duplicated in a closed vessel where an autogeneous pressure of about 50 p.s.i. was generated and maintained throughout the heating. The rosin product was similarly sparged with $CO_2$ to yield a finished product having the following analysis:

Fatty acids, percent _____ 3.0
Unsaponifiables, percent _____ 13.3
Resin acids, percent _____ 83.7
   Percent conjugated unsaturates _____ 2.2
   Percent dehydroabietic _____ 28.0
   Percent other resin acids _____ 68.8
Acid number _____ 163
Softening point, ° F. _____ 112

The rosins from both these runs were soft and fluid at room temperature.

For comparative purposes several additional runs were made following the procedures of U.S. Patent 2,311,386. In the first run a distilled tall oil product having the following analysis was employed as the starting material.

Fatty acids, percent _____(35.8% linoleic)__ 53
Unsaponifiables, percent _____  4
Resin acids, percent _____ 43
Acid number _____ 166

This tall oil product was heated with 0.5% iodine for 60 minutes at 485° F. and sparged with $CO_2$. The resin acid portion in the product was separated by selective esterification of the fatty acids followed by saponification of the resin acids. The fatty acids were extracted with ether leaving a relatively fatty acid free resin acids soap which was reacidified to obtain the following product:

| | |
|---|---|
| Fatty acids, percent | 6.7 |
| Unsaponifiables, percent | 8.3 |
| Resin acids, percent | 85 |
|     Percent conjugated diunsaturates | 2.0 |
|     Percent dehydroabietic | 53.1 |
|     Percent other resin acids | 44.9 |
| Acid number | 161 |
| Softening point, °F. | 143 |

This rosin material was a hard, brittle solid at room temperature.

By following the procedure of Example III of the 2,311,386 patent, crude tall oil was permitted to stand and separate out crystals of rosin. These rosin crystals were filtered from the supernatent tall oil fraction under an aspirator produced vacuum to yield a product having the following analysis:

| | |
|---|---|
| Fatty acids, percent _____(36.9% linoleic acid) | 18.0 |
| Unsaponifiables, percent | 8.0 |
| Resin acids, percent | 74.0 |
| Acid number | 173 |

This material was treated at 485° F. for 60 minutes with 0.5% iodine and sparged with $CO_2$. The resin acids were extracted as in the preceding run and analyzed with the following results:

| | |
|---|---|
| Fatty acids, percent | 5.1 |
| Unsaponifiables, percent | 11.8 |
| Resin acids, percent | 83.1 |
|     Percent conjugated diunsaturates | 1.8 |
|     Percent dehydroabietic | 56.8 |
|     Percent other resin acids | 42.4 |
| Acid number | 163 |
| Softening point, °F. | 142 |

This rosin was also a hard brittle solid at room temperature.

The soft disproportionated rosin of this invention as produced in the first two runs reported above is similar to the hard, brittle disproportionated rosin of the prior art in that all of the disproportionated rosins have a very low quality of the conjugated diunsaturated resin acids. The disproportionated rosins are consequently quite stable to oxidation. There is, however, substantial differences in both physical properties and composition of the resin acids between the hard and soft disproportionated rosins. The hard brittle disproportionated rosins of the prior art have a very high percentage of dehydroabietic acid present while the soft rosins of this invention have a much lower percentage of this type resin acid. It has been observed that a characteristic of all of our soft disproportionated rosins is a relatively low dehydroabietic acid content as compared to other disproportionated rosins. Quite apparently under the very special conditions for making soft rosin, by our methods, there is greater conversion of the conjugated diunsaturated resin acids to other types of resin acids with relatively less conversion to dehydroabietic acid. From our studies, it has been found that a soft, fluid disproportionated rosin product is always associated with a dehydroabietic acid content of less than 40% of the total resin acids. This is not to say, however, that the low dehydroabietic acid content causes the low melting properties of our rosin. It is believed, rather, than the various other resin acids which are formed instead of the dehydroabietic are the cause of these unique properties.

The true difference in resin acid composition between hard disproportionated rosins of the prior art and the soft rosin of the present invention may best be seen in gas chromatographic curves obtained for the different rosins. These curves indicate that while some of the same resin acids are present in both types of disproportionated rosins, the quantities present are in all cases quite different. Additionally, however, the soft rosins give peak indicating substantial quantities of other resin acids which are not present in hard types of disproportionated rosins or for that matter in the original rosin. Due to analytical difficulties, however, we have not yet been able to isolate and identify the specific resin acids which cause these peaks.

There are a number of factors which prevent exact determination of what causes our soft rosin. One of these factors as previously indicated, is the tremendous difficulty in isolating and identifying all the resin acids present in our soft rosin particularly since some of these resin acids do not seem to correspond to any previously identified resin acid. Additionally, the problem is further complicated by the fact that the mixture of resin acids has physical properties which are considerably different from the weighted average properties of the individual resin acids in the mixture. This is well evidenced by the fact that the softening point of below 130° F. for our soft rosin is considerably lower than the softening point of any pure isolated, identified resin acid.

The soft rosin of this invention is a fluid at ambient temperature (77° F.). It does not have the low viscosity and free flowing characteristics of liquids such as water, but is a very highly viscous material such as cold molasses. It nevertheless meets the requirements of fluids which are defined in the Fluid Mechanics art as "a substance that undergoes continuous deformation when subjected to shear stress, as the whole fluid being continuous so that the action of the forces produce relative motion rather than impact" and which are defined by Webster as "substances that alter their shape in response to any force, however small and that tend to flow or to conform to the outline of its container." The soft rosin of this invention will flow under the force of gravity to fill a container although it may take several days to do so. These rosins have extremely high tack, however, and will stick to a vertical side of a container to form a film of from an eighth to a half of an inch which will not flow under the influence of gravity. The soft rosin can easily be penetrated with an ordinary lead pencil and can easily be pulled into fine threads by hand. These properties are in marked contrast to the previously known rosins which are all brittle solids at ambient temperatures.

The following example illustrates the practice of this invention using gum rosin and indicates the necessity for employing the stringent conditions specified hereinabove with gum and wood rosins.

*Example 2*

The gum rosin used in this example was a WW grade having the following analysis:

| | |
|---|---|
| Unsaponifiables (principally terpene type material), percent | 7.5 |
| Resin acids, percent | 92.5 |
|     Percent conjugated diunsaturates | 33.0 |
| Acid number | 162 |
| Softening point, °F. | 171 |

10 parts of iodine were added to 1000 parts by weight of the rosin and the mixture heated to 490° F. in a closed autoclave. A pressure of 300 p.s.i. was developed and maintained while heating was continued for 60 minutes. The product was analyzed with the following result:

| | |
|---|---|
| Unsaponifiables, percent | 15.1 |
| Resin acids, percent | 84.9 |
|     Percent conjugated diunsaturates | 2.3 |
|     Percent dehydroabietic | 32.0 |
|     Percent other resin acids | 66.7 |
| Acid number | 149 |
| Softening point, °F. | 115 |

This product was a soft, viscous fluid at room temperature.

The same WW gum rosin was heated at 500° F. for 60 minutes with 0.5% iodine in an open kettle. The product obtained was a hard, brittle solid at room temperature and had the following analysis:

| | |
|---|---|
| Unsaponifiables, percent | 7.7 |
| Resin acids, percent | 92.3 |
|     Percent conjugated diunsaturates | 33 |
|     Percent dihydroabietic | 46 |
|     Percent other resin acids | 21 |
| Acid number | 161 |
| Softening point, °F. | 171 |

*Example 3*

WW wood rosin having the following partial analysis was treated at 500° F. for 60 minutes with 1% iodine in an open kettle.

| | |
|---|---|
| Unsaponifiables (primarily terpenes), percent | 7.5 |
| Resin acids, percent | 92.5 |
|     Percent conjugated diunsaturates | 29 |
| Acid number | 168 |
| Softening point, °F. | 174 |

The hard, brittle product obtained upon this treatment had the following analysis:

| | |
|---|---|
| Unsaponifiables, percent | 7.8 |
| Resin acids, percent | 92.2 |
|     Percent conjugated diunsaturates | 29 |
|     Percent dehydroabietic | 43 |
|     Percent other resin acids | 28 |
| Acid number | 165 |
| Softening point, °F. | 170 |

The use of other catalysts commonly employed for disproportionation of rosin does not result in the soft rosin product of this invention. This is illustrated in the following examples wherein the use of sulfur dioxide and palladium on carbon is shown.

*Example 4*

10 parts by weight of a palladium on carbon catalyst and 1000 parts by weight of the same tall oil rosin used in Example 1 were mixed together in 400 parts by weight of xylol solvent.

The use of the solvent is necessary in order to obtain adequate dispersion of the particulate catalyst in the rosin and to permit removal of the catalyst after treatment. The mixture was then heated at 485° F. for a period of 60 minutes in a closed autoclave developing a pressure of about 175 p.s.i. The hot rosin was filtered to remove catalyst and the solvent distilled in vacuo from the rosin. The resultant product was a hard, brittle material at room temperature and had the following analysis:

| | |
|---|---|
| Fatty acids, percent | 3.0 |
| Unsaponifiables, percent | 4.0 |
| Resin acids, percent | 93 |
|     Percent conjugated diunsaturates | 0.8 |
|     Percent dehydroabietic | 62.9 |
|     Percent other resin acids | 26.3 |
| Acid number | 174 |
| Softening point, °F. | 169 |

1000 parts by weight of the same tall oil rosin employed in Example 1 was heated to 500° F. $SO_2$ was slowly bubbled through the rosin at a rate of 3%/hr. (based on the wt. of the rosin) while the temperature was maintained. This treatment was continued for 180 minutes after which the mixture was steam sparged to remove the residual $SO_2$ catalyst. The resultant product had the following analysis:

| | |
|---|---|
| Fatty acids, percent | 3.1 |
| Unsaponifiables, percent | 8.9 |
| Resin acids, percent | 88 |
|     Percent conjugate diunsaturates | 2.1 |
|     Percent dehydroabietic | 63 |
|     Percent other resin acids | 34.9 |
| Acid number | 167 |
| Softening point, °F. | 160 |

Additionally, a number of hard, brittle commercial disproportionated rosins have been analyzed to obtain the following data:

| Type Rosin | Type Catalyst | Composition, Percent | | Soft Point, °F. |
|---|---|---|---|---|
| | | Resin Acids/ Dehydroabietic | Unsaponifiables | |
| Wood | Palladium on Carbon | 87/62.4 | 7.0 | 163.5 |
| Tall Oil | $SO_2$ | 85.7/66.1 | 7.2 | 155 |
| Wood | $SO_2$ | 85/57.4 | 7.1 | 152 |

It will again be noted that in all the above cases that high softening points are associated with relatively high dehydroabietic contents.

There is one quite obvious detrimental effect of disproportionating rosin according to our methods. This is the conversion of certain amounts of the resin acids to unsaponifiable materials. The quantity of resin acids thus converted is not so much dependent upon the total disproportionation of the resin acid which occur as it is upon the severity of the conditions employed. For this reason, it is desirable to employ the smallest amount of catalyst and the lowest temperature practical, consistant with economical reaction times.

Under relatively severe conditions of temperature and catalyst the conversion of resin acids to unsaponifiables may be as high as 15% or more. Under very mild conditions using very long reaction times this undesirable conversion may be limited to 1 or 2%. Normally, however, using moderate conditions of say 500° F. with 0.15% catalyst, the conversion of resin acids will be intermediate between these extremes or about 8 to 10%.

It should be noted, however, that the use of gum or wood rosins requires relatively severe conditions to obtain the desired soft product. It is consequently not possible to achieve the very low 1 or 2% conversions possible with tall oil rosin.

The compositions of our soft rosin products may accordingly vary quite widely depending upon the starting rosin and the process conditions employed.

In the very extreme case where a tall oil rosin of low linoleic content and only 75% resin acids is employed it is possible using severe reaction conditions to obtain a soft fluid rosin product of about 60% resin acids, 19% fatty acids and 21% unsaponifiables. More realistically, however, using a tall oil rosin of 88% resin acids as a starting material and moderate process conditions, the rosin product will have a resin acid content of about 80%, a fatty acid content of about 6% and an unsaponifiable content of about 14%.

It may be noted here that, although the polyunsaturated fatty acid in tall oil rosin are hydrogenated during treatment, there is no change in the total quantity of fatty acids in the rosin product as compared to the starting material.

In the case of gum and wood rosins, using the lowest grade possible (12% unsaponifiables) and very severe conditions that the resultant rosin product will have a resin acids content of about 72% with the remainder being unsaponifiable. Using a better grade gum or wood rosin (about 8% unsaponifiable) and moderate process conditions, the soft fluid product will have a rosin acid content of about 82% with 18% unsaponifiables.

It should be recognized, of course, that in the case of either the tall oil, wood, or gum rosins that even better products as regards resin acid content can be prepared than those indicated above by proper choice of starting materials and process conditions.

If desired, the soft rosin products of this invention may be distilled to substantially improve resin acids content, which during the disproportionation reaction may, as has been indicated, be reduced by as much as 15% through the formation of unsaponifiables. It is generally desirable during the distillation to remove 1 to 10% of the lowest boiling material and leave a 1–10% residue of highest boiling material. By so doing a relatively large percentage of the unsaponifiable materials and color bodies formed during the disproportionation are removed resulting in a substantial increase in the resin acid content and acid number and a substantial improvement in color. Through distillation, it is quite possible to raise the resin acids content of the rosin to a level equal to or above the resin acids content of the starting rosin. It is, in fact, the preferred practice of this invention that such distillation methods be employed and the resin acids content increased to above 90%.

The removal of these unsaponifiable materials by distillation with the resultant increase in resin acids content does not materially affect the softening point or the fluidity of the rosin. This clearly indicates that the low softening point and fluidity of our rosin is due to the specific mixture of resin acids and not due to any possible plasticization of the resin acids by the unsaponifiable materials formed during disproportionation. For example, distilling a soft disproportionated tall oil rosin containing 4.5% fatty acids, 12.6% unsaponifiables and 82.9% resin acids to remove the lowest boiling fraction of 7% and a residue of 8% yields a product having 2.4% fatty acids, 8.1% unsaponifiables and 89.5% resin acids. By this distillation, the softening point of the soft rosin product changed from 112 to 114° F. with no discernable change in fluidity.

The iodine catalyst may be used in conjunction with other disproportionation catalysts to produce soft rosin products. In this type of operation the rosin is first disproportionated with another catalyst followed with a treatment with iodine. While such practice generally permits the use of less iodine catalyst and shorter reaction time, the remaining conditions of temperature and pressure specified hereinabove must still be employed.

In some areas of rosin utilization, the unique ambient temperature fluid characteristics of our rosin provide substantial advantages over the harder rosins of the art. In the area of extension of synthetic resins with rosin, our soft rosin provides substantial plasticization as well as extension. In adhesives our soft rosin has excellent utility as a tackifier. Because of its high fluidity, our soft rosin can be easily converted into aqueous soap solutions below the boiling point of water. The ease of making soaps coupled with the low quantity of conjugated diunsaturated acids present, makes our rosin an excellent emulsifier for the emulsion polymerization of SBR and other synthetic rubbers. These are but a few of the many advantageous uses of our soft rosin; other uses wherein the unique properties of our soft rosin can be beneficially employed will be evident to those in the rosin field.

We claim:

1. The method of treating a tall oil rosin to produce a disproportionated rosin which is a fluid at ambient temperature which comprises heating a tall oil rosin having a minimum resin acids content of 75% by weight and a maximum of 6% of the weight of said resin acids of polyunsaturated non-resin acid materials to a temperature between 300 and 580° F. in the presence of from 0.01 to 3% iodine, for a period of time between 10 minutes and 10 hours to lower the ASTM Ring and Ball softening point of the rosin to below 130° F.

2. The method of claim 1 wherein the tall oil rosin being treated has a minimum resin acids content of 88% and a maximum of 3% of the weight of said resin acids of polyunsaturated non-resin acid materials.

3. The method of claim 1 wherein the tall oil is treated with from 0.1 to 1% iodine catalyst at a temperature between 400 and 500° F.

4. A fluid disproportionated tall oil rosin containing no more than 5% of conjugated diunsaturated resin acids produced by the method of claim 1.

5. The method of disproportionating gum rosin to produce a rosin which is a fluid at ambient temperature which comprises heating said rosin which contains no more than 12% by weight of non-resin acid materials to a temperature between 300 and 580° F. in the presence of between 0.75 and 3% iodine under a pressure at least as great as the pressure autogenuously developed by the rosin-iodine mixture at the temperature of heating for a period of time between 10 minutes and 10 hours sufficient to reduce the ASTM Ring and Ball softening point to below 130° F.

6. A fluid disproportionated gum rosin containing no more than 5% of conjugated diunsaturated resin acids produced by the method of claim 5.

7. The method of disproportionating wood rosin to produce a rosin which is fluid at ambient temperature which comprises heating said rosin which contains no more than 12% of non-resin acid materials to a temperature between 475° F. and 580° F. in the presence of between 1 and 3% iodine under a pressure of at least as great as the pressure autogenuously developed by the rosin-iodine mixture at the temperature of heating for a period of time between 10 minutes and 10 hours sufficient to reduce the ASTM Ring and Ball softening point of the rosin to below 130° F.

8. A fluid disproportionated wood rosin containing no more than 5% of conjugated diunsaturated resin acids produced by the method of claim 7.

References Cited by the Examiner

UNITED STATES PATENTS

| | | | |
|---|---|---|---|
| 1,957,788 | 5/1934 | Lister | 260—97 |
| 2,299,577 | 10/1942 | Hasselstrom | 260—97.5 |
| 2,311,386 | 2/1943 | Hasselstrom | 260—97.5 |
| 2,396,671 | 3/1946 | Auer | 260—97 |
| 2,503,268 | 8/1960 | Hasselstrom | 260—97.5 |
| 2,797,211 | 6/1957 | Morin et al. | 260—97 |
| 2,872,315 | 2/1959 | Watkins | 260—97.5 |
| 2,887,475 | 5/1959 | Watkins | 260—105 |

OTHER REFERENCES

Harris: "Rosin and Rosin Derivatives," p. 787, copy available in 260–97 (1953).

LEON J. BERCOVITZ, *Primary Examiner.*

F. McKELVEY, *Assistant Examiner.*